F. A. JAHNKE.
LUBRICATING DEVICE FOR GAS ENGINES.
APPLICATION FILED MAR. 25, 1909.
946,133.
Patented Jan. 11, 1910.
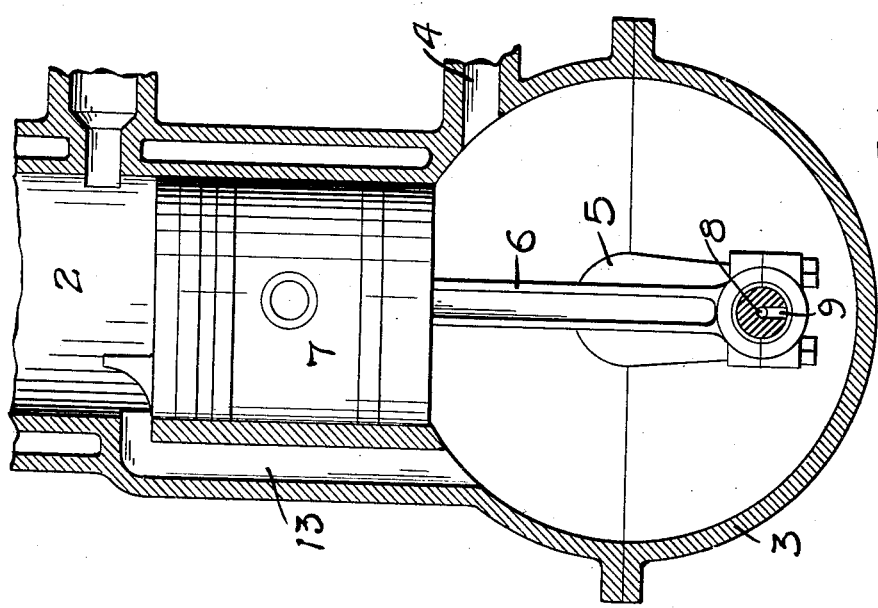
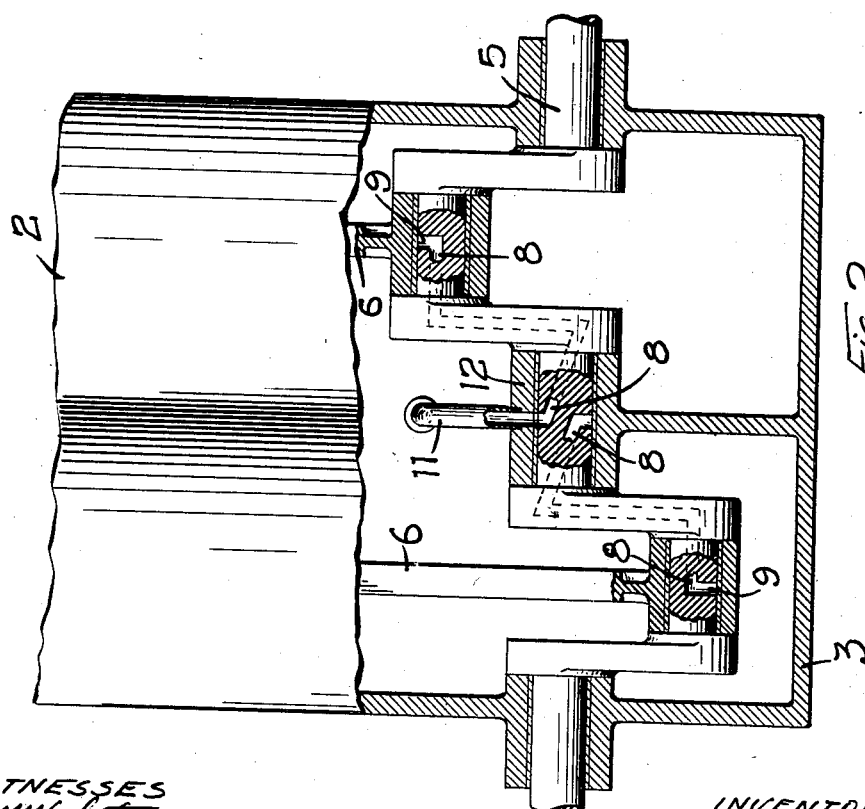
WITNESSES
INVENTOR
FRED A. JAHNKE
BY Paul & Paul
HIS ATTORNEYS

UNITED STATES PATENT OFFICE.

FRED A. JAHNKE, OF MINNEAPOLIS, MINNESOTA, ASSIGNOR TO MINNEAPOLIS MOTOR & TRUCK CO., OF MINNEAPOLIS, MINNESOTA.

LUBRICATING DEVICE FOR GAS-ENGINES.

946,133.  Specification of Letters Patent.  Patented Jan. 11, 1910.

Application filed March 25, 1909. Serial No. 485,630.

*To all whom it may concern:*

Be it known that I, FRED A. JAHNKE, of Minneapolis, Hennepin county, Minnesota, have invented certain new and useful Improvements in Lubricating Devices for Gas-Engines, of which the following is a specification.

My invention relates to gas engines and particularly those of the two-cycle type. Generally in gas engines of this type, a pump is employed for the purpose of introducing a lubricant into the crank case during the operation of the engine.

The purpose of my invention is to entirely dispense with all pumps and outside means for introducing the lubricating agent, and utilize the vacuum formed in the crank case to create a suction sufficient to draw the lubricating oil through suitably arranged ducts into the said case.

My invention consists generally in providing the cylinder of a two-cycle engine with a lubricating duct, communicating through the crank shaft with the wrist pins of the piston rod, for the purpose of thoroughly lubricating the bearings during the operation of the engine.

In the accompanying drawings, forming part of this specification, Figure 1 is a detail, sectional view, illustrating the section of a two-cycle engine, Fig. 2 is a view taken on a line substantially at right angles to the section line of Fig. 1.

In the drawing, 2 represents an engine cylinder, having a crank case 3, which communicates with the gas intake pipe from the carbureter through a pipe 4.

A crank shaft 5 is provided in the box 3, on which a piston rod 6 is mounted having a piston 7. An oil duct 8 is provided in the crank shaft, having branch passages 9, through which the oil is conducted to the bearing. This passage 8, as indicated in Fig. 2, is extended through the crank of the shaft and terminates opposite the discharge passage of a lubricating duct 11, which extends through the wall of the shaft box and terminates in a bearing 12. A passage 13 leads from the crank case up to the cylinder 2. Gas is admitted to the case 3 from the carbureter and on the compression stroke of the piston, the gas is forced around through the passage 13 into the end of the cylinder, where the igniter is located. On the up-stroke of the piston, a sufficient suction will be created in the crank case to draw the lubricating oil in through its duct and cause it to be discharged into the bearings of the piston rod on the shaft. The bearing of the piston rod on the crank is sufficiently loose so that the vacuum formed in the crank case will extend through the bearing into the lubricating duct and cause the suction created thereby to draw the oil into the bearing. Automatic lubrication of this bearing will thus take place, without the use of any outside pump or other device, which is usually required in engines of this type.

It is my purpose to apply this invention to a two-cycle engine, where a crank case is employed and where compression followed by suction takes place in said case through the reciprocation of the cylinder piston. The bearings of the piston rods on the crank shaft will be sufficiently loose to allow the suction created by the vacuum in said crank case to draw the oil in said duct into said bearing, substantially as described.

I claim as my invention:—

1. A lubricating device for two-cycle engine, comprising a cylinder having a crank case and a shaft journaled in said case, said shaft and the crank thereon having oil ducts therein communicating with an oil supply and through the bearing within the crank case, the oil being drawn into said crank case through the formation of the vacuum therein, substantially as described.

2. The combination, with the cylinders of a two-cycle engine, of a crank shaft having bearings, and a lubricating duct communicating with said bearings, said shaft and the crank thereon having oil passages therethrough arranged to alternately register with the duct in said bearings, said oil passages having discharge openings, and pistons provided in said cylinders and having rods and bearings therefor communicating with said discharge openings, the vacuum formed in the crank case by the movement of the piston extending through the bearing of the piston on the crank to said passage and lubricating duct, whereby the oil will be automatically drawn into the piston rod bearing, substantially as described.

In witness whereof, I have hereunto set my hand this 9th day of February 1909.

FRED A. JAHNKE.

Witnesses:
RICHARD PAUL,
J. A. BYINGTON.